(No Model.)

W. H. KENDRICK & J. B. OKEY.
SOIL PULVERIZER.

No. 301,610. Patented July 8, 1884.

Witnesses:
Gustav Bohn
M. A. Moore

Inventors:
William H. Kendrick
Joseph B. Okey
William H. Kendrick
Attorney

UNITED STATES PATENT OFFICE.

WILLIAM H. KENDRICK AND JOSEPH B. OKEY, OF INDIANAPOLIS, INDIANA.

SOIL-PULVERIZER.

SPECIFICATION forming part of Letters Patent No. 301,610, dated July 8, 1884.

Application filed December 12, 1883. (No model.)

*To all whom it may concern:*

Be it known that we, WILLIAM H. KENDRICK and JOSEPH B. OKEY, citizens of the United States, residing at Indianapolis, in the county of Marion, in the State of Indiana, have invented a new and useful Improvement in Machines for Crushing and Pulverizing the Soil, of which the following is a specification, reference being had to the accompanying drawings.

The invention relates to those machines used for the purpose stated which are provided with rollers for crushing the soil and cutters for cutting the sods, both operations being effected simultaneously in the operation of our device, which is simple in construction and easily and readily managed and operated.

Figure 1:
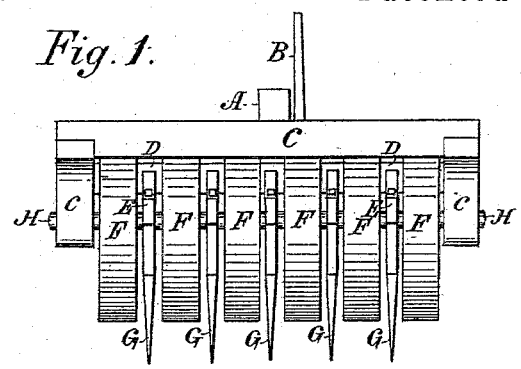
Figure 2:
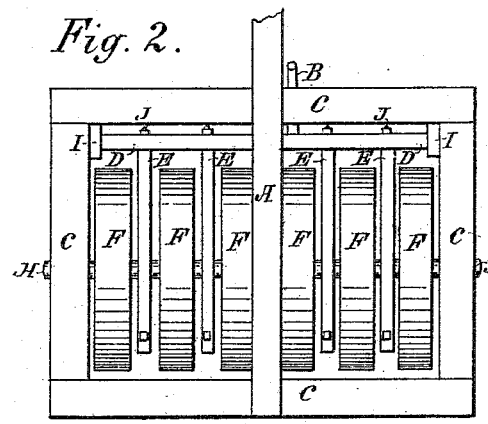
Figure 4:
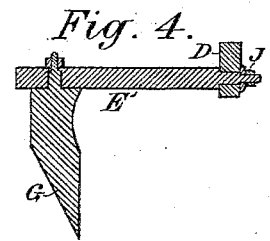
Figure 3:
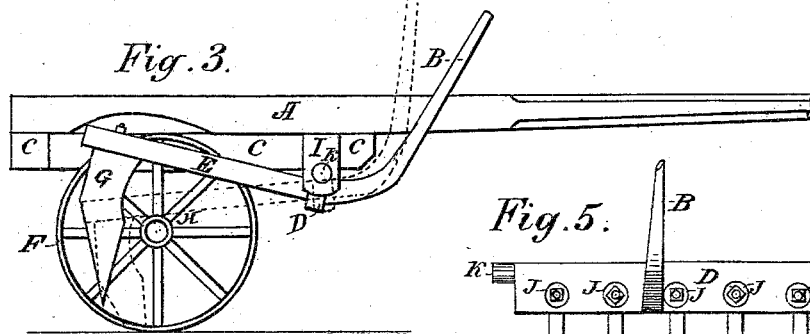
Figure 5:
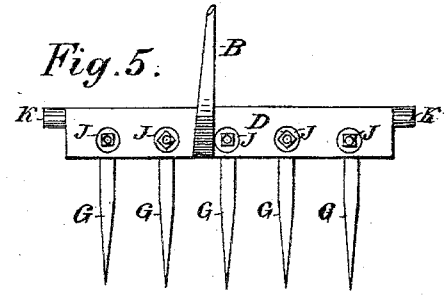

In the accompanying drawings, Figure 1 is a rear view of a crushing and cutting machine having our improvements. Fig. 2 is a top view of the same. Fig. 3 is a side view, certain parts being removed to show the cutters. Fig. 4 is a sectional view showing connection of cutter and cross-beam. Fig. 5 shows a front view of cross-beam to which the arms holding the cutters are secured.

A designates the draft-pole, which is secured to the main frame C. A transverse shaft, H, is mounted in a downward extension of the main frame, and on said shaft is placed a number of broad wheels, forming the rollers F for crushing the soil.

D is a cross-beam, the ends of which are provided with journals K, having bearings in the hangers I, which are made fast to the frame C.

G indicates the sod-cutters, which are secured to the arms E, the forward ends of said arms being passed through the cross-beam D, to which they are secured by means of washers and nuts J.

To the beam D is fastened a lever, B, said lever turning upward in front for convenient handling, as shown. The arms E, carrying the cutters, extend rearward from beam D and over the shaft H, and the cutters G are attached to said arms, so that they extend downward just in the rear of said shaft and between the rollers, as shown. Thus the crushing and cutting devices are brought within a comparatively small space, being on transverse lines very near each other, and the arms E are made long enough for the sufficient raising or lowering of the cutters, as desired, such movement being effected by means of the hand-lever B and the cross-beam D, turning on its bearings in hangers I. The said lever may be provided with any suitable means for adjusting it to any desired inclination, so that the cutters may be held above the ground or extend therein the desired depth.

We are aware of the Patents Nos. 29,659 and 66,240, their construction, and the combination of their various parts, and we therefore do not broadly claim the same.

We are also aware of the Patents Nos. 82,793 and 244,040, and these also we disclaim.

We claim—

In a soil crushing and cutting machine, a main frame carrying shaft H, with independent rollers F, rocking cross-beam D, with arms E, extending rearward over shaft H, and carrying cutters G, adapted to operate between the rollers, and the lever B, fastened to beam D, the parts being constructed and arranged substantially as shown, for the purpose set forth.

WILLIAM H. KENDRICK.
JOSEPH B. OKEY.

Attest:
CHARLES W. CRUMEN,
A. S. PATTERSON.